United States Patent

Zwart et al.

[11] 3,842,567
[45] Oct. 22, 1974

[54] MULTIPLE PANE UNITS

[75] Inventors: Jacob Zwart; Hugo-Guido Wielockx, both of Balen-Neet; Gaston-Hugo Guens, Mol, all of Belgium

[73] Assignee: Glaverbel S.A., Watermael-Boitsfort, Belgium

[22] Filed: June 14, 1972

[21] Appl. No.: 262,551

[30] Foreign Application Priority Data
June 18, 1971 Luxembourg.......................... 63369

[52] U.S. Cl.............................. 53/7, 52/304, 53/38, 53/79, 156/102
[51] Int. Cl............................................. B65b 31/04
[58] Field of Search.......... 53/7, 12, 22 R, 22 B, 37, 53/38, 39, 79, 112 R; 52/304; 156/99, 101, 102, 104, 105, 107, 109, 286

[56] References Cited
UNITED STATES PATENTS

| 2,213,339 | 9/1940 | Hopfield | 156/109 |
| 2,756,467 | 7/1956 | Etling | 52/304 X |
| 3,078,627 | 2/1963 | Dunipace et al. | 53/7 |
| 3,292,343 | 12/1966 | Schroeder | 53/387 |
| 3,577,698 | 5/1971 | Rueckberg | 53/37 |
| 3,590,557 | 7/1971 | Vogel | 53/39 X |
| 3,735,553 | 5/1973 | Houser | 53/112 R |

Primary Examiner—Travis S. McGehee
Attorney, Agent, or Firm—Spencer & Kaye

[57] ABSTRACT

The pressure of the gas filling the space between two panes of a multiple pane unit is established by placing the space in communication with an external source of pressure, which may be the surrounding environment, laterally deflecting the panes adjacent the space inwardly or outwardly by a predetermined amount sealing the space to isolate from the exterior and from the pressure source, and removing the lateral deflection forces.

11 Claims, 12 Drawing Figures

MULTIPLE PANE UNITS

BACKGROUND OF THE INVENTION

This invention relates to a method and apparatus for conditioning the internal pressure in a double or multiple panel unit containing at least two spaced sheets, each composed of glass, plastic or vitrocrystalline material, and including sealing means enclosing the space or spaces between such sheets. The invention also relates to units conditioned by such method or apparatus.

Panel units including at least two spaced sheets of glass are used, for example, for glazing purposes. In the manufacture of such glazing units, the dewpoint of the gas which is sealed in the space inside the unit should be kept low enough to prevent any subsequent condensation on the inside surfaces of the sheets of the panel.

Generally speaking, two different techniques are in use for keeping the dewpoint of the gas low. The first involves providing two holes through the sealing means and introducing a dehydrated gas into the unit through one of the holes while allowing gas to be expelled from the unit through the other hole. Once the space or spaces inside the unit is or are completely filled with dehydrated gas, the holes are plugged, thus finally trapping dehydrated gas within the unit.

The second technique consists in introducing into the unit before the interior space or spaces is or are hermetically sealed, a certain quantity of dehydrating agent for keeping the dewpoint of the gas within the unit at a sufficiently low value to prevent any subsequent condensation under the temperature conditions to which the unit is likely to be exposed.

These techniques are satisfactory if the glazing units are to be installed at a place where the environmental pressure and temperature is comparable to that where the units are manufactured. However if the units are installed at a place where the pressure or temperature is substantially different from the pressure or temperature at the place of manufacture the sheets of the glazing unit become curved. For example, if the place of installation is at a substantially higher altitude the external surfaces of the glazing unit become convex. If the place of installation is at a substantially lower altitude than the place of manufacture the external surfaces become concave. This curving of the sheets is objectionable for at least two reasons, the first being the resulting reduction in the mechanical strength of the unit. In extreme cases the sheets of the unit may even break before the unit reaches the place where it has to be installed. The second reason is an aesthetic one; as a rule architects refuse to accept glazing units incorporating curved sheets since their surfaces reflect light in an unattractive manner.

Another example of the incidence of the problem just referred to is the construction of hollow panels to be installed in refrigeration chambers, e.g., as viewing closures thereof.

Hitherto, various ways have been suggested of preventing the sheets of double or multiple glazing units from becoming curved when taken to a place at a different altitude from the place of manufacture.

It has for example been suggested to fit the units during manufacture with a "respirator." The "respirator" may comprise a cylinder containing a dehydrating material and communicating on the one hand with the interior of the unit via a small tube attached to the sealing means, and on the other hand to the ordinary gaseous environment in which the unit is manufactured. During transportation of the glazing unit to a higher altitude, some of the gas initially trapped within the unit passes to the atmosphere via the respirator under the pressure differential. During transportation of the unit to a place at a lower altitude than the place of manufacture, gas passes into the interior of the unit from the environment via the respirator, which dehydrates the gas. When the unit reaches its destination, the respirator is removed and the hole in the sealing means is plugged.

The units manufactured in this way are costly, due to the necessity of installing the respirator and due to the additional labor required on site for removing the respirator and re-sealing the unit, this operation being a critical one because gas must not be allowed to pass into or out of the unit.

It has also been proposed to assemble the double or multiple glazing units in a chamber in which a sub-atmospheric pressure is maintained comparable to the atmospheric pressure to be encountered at a place where the units are to be installed. The sealing means of the glazing units are pierced while the units are in the vacuum chamber in order to equalize the pressures in the chamber and in the units, whereafter the units are re-sealed while they are still in the chamber. When the units are withdrawn from the chamber the opposed faces of the unit are concave but the faces become restored to a flat condition as the units are transported to the intended place of installation.

The necessity to condition the units within a vacuum chamber is a disadvantage and the re-sealing of the units while they are in the chamber is not an easy or convenient operation.

According to a further prior proposal, the interior spaces of the glazing units are coupled to a vacuum chamber in which there is a sub-atmospheric pressure slightly lower than the atmospheric pressure at the intended place of installation. The lower pressure prevailing in the chamber draws gas out of the units and they have to be re-sealed without allowing the pressure within the units to rise, an operation which presents some difficulty.

None of the prior art methods provides a satisfactory solution to the problem of conditioning the pressures within double or multiple glazing units, particularly in the course of mass-production.

SUMMARY OF THE INVENTION

It is an object of the invention to provide a method and apparatus which enables the pressures in double or multiple panel units to be conditioned in a relatively simple manner and which obviates at least the majority of the disadvantages of the aforesaid known methods which have been applied to glazing units.

According to the present invention, there is provided a method of conditioning internal pressure in a double or multiple panel unit having at least two spaced sheets, each composed of glass, plastic or vitrocrystalline material, and including sealing means enclosing the interior space or spaces between such sheets. The method involves the steps of temporarily exerting a flexing force on at least one of the sheets via mechanical means in contact with a face of such sheet so as to reduce or enlarge the volume of at least one of the interior spaces, and during the period of time for which such sheet is held elastically flexed placing at least one of the interior spaces in communication with a gaseous medium which is outside the unit which is at a pressure and temperature such that gaseous medium leaves or enters the reduced or enlarged space to bring the pressure therein to a required value, such communication being established before or during the exertion of flexing force and being terminated before the sheet is relieved of such force.

The method according to the invention enables the internal pressure in the internal space, or in at least one internal space, in a double or multiple panel unit to be conditioned in a relatively simple manner. The ease with which the conditioning can be performed is due largely to the fact that the pressure prevailing within the unit after conditioning is at least in part determined by external forces applied to a sheet or sheets of the unit. These forces cause flexure of a sheet or sheets of the unit to change the volume of the interior space or spaces and the flexing forces do not cease to be operative until the unit has been re-sealed.

It is to be understood that the flexing force applied to the, or a, sheet need not be constant throughout the performance of the conditioning method. For example, communication between the interior of the unit and the outside medium may be established while the flexing forces are building up to their maximum value and/or the flexing forces may commence to be relaxed before the unit is re-sealed provided that the re-sealing of the unit is completed before the relaxation of the flexing forces is complete.

It will be understood that if the unit is to be installed at a substantially higher altitude than the place where the unit is conditioned, the conditioning is performed so as to reduce the internal pressure in the unit whereas if the unit is to be installed at an altitude substantially lower than that of the place where the conditioning is performed, the pressure within the unit is increased. In either case the outside medium with which the interior of the unit is in communication during the conditioning method may be at the prevailing atmospheric, or ambient, pressure. If required, such outside medium may be heated or cooled so that its temperature plays a part in establishing the final internal pressure in the unit because the gas within the unit becomes cooled or heated to the environmental, or ambient, temperature after the unit has been sealed. It is to be understood however that it is also possible for the outside medium with which the interior of the unit communicates during the conditioning method to be at a pressure which is higher or lower than the prevailing environmental, or ambient, pressure to assist in establishing the requisite final pressure within the conditioned unit and in such cases the said outside medium may, but need not, be at a temperature different from the environmental, or ambient, temperature.

The final pressure within the conditioned unit may be controlled so that on installation at a predetermined altitude or under predetermined atmospheric pressure or temperature conditions, the external faces of the unit become restored to their flat condition.

The method according to the invention does not require the provision of a large vacuum chamber for accommodating the units during conditioning.

The step of providing an external medium at a pressure which is higher or lower than the ambient pressure is justified in certain cases, if, for example, the amount of flexure of the sheet or sheets which would otherwise be necessary to establish the requisite internal pressure would be liable to damage or break the sheet or sheets. In such cases the exertion of the external flexing forces is still of great value because such forces enable the pressure of the external medium to be much closer to the prevailing atmospheric pressure than would be necessary in the absence of such external forces. By thus keeping the pressure of the external medium closer to the prevailing environmental pressure the task of re-sealing the unit without allowing gas to enter or escape from the unit is simplified.

Particular importance is attached to embodiments of the invention in which the unit is a double panel unit. A double panel unit can be conditioned more easily than a unit containing three or more spaced sheets.

Preferably a flexing force is exerted on at least one sheet face forming an external face of the unit. The method is particularly easy to perform in such cases. However it is within the scope of the invention to condition for example the pressure in an interior space of a unit containing three or more spaced sheets by exerting flexing pressure on at least one interior sheet limiting that space, via mechanical means which is inserted between that sheet and another sheet of the unit. In such a case the opening through which the mechanical means is given access to the interior of the unit can be sealed up after the flexing force has been relaxed and the mechanical means has been withdrawn.

For the purposes primarily in view, the flexing force or forces is or are applied to a sheet or sheets so as to reduce the volume of at least one interior space of the unit. The method is performed in that way for cases in which the unit will be exposed when in use to environmental pressure less than the environmental pressure where the conditioning method is performed. In such cases the method can be very easily performed because the sheet or sheets which are to be flexed have merely to be subjected to external pressure by mechanical means applied against the exposed face or faces of the sheet or sheets. Moreover, when the invention is performed in that way, gas is expelled from the interior space or spaces during the conditioning treatment so that there is no tendency for surrounding non-dehydrated gas to be drawn into the interior of the unit.

In a particularly advantageous embodiment of the invention, the exposed sheet faces of the unit are simultaneously subjected to equal and oppositely directed forces, thereby to reduce the volume of at least one interior space. This procedure is very simple because it is merely necessary to subject the unit to clamping pressure between opposed mechanical members.

While the invention can be applied for conditioning panel units of various kinds of construction, it is preferred to apply the method to units in which the sealing means includes at least one metal ribbon or strip welded or soldered to metallized margins of the sheets. The sealing means may for example take the form of a lead alloy ribbon. The advantage of using a unit of that kind is that the sealing-tightness of the unit is not very likely to be impaired by substantial flexing forces exerted on a sheet or sheets of the unit, because if the metal ribbon is fairly ductile, as is a lead alloy ribbon, it can yield under the applied forces so that these are not entirely sustained by the sheet/ribbon joints.

In preferred embodiments of the invention the communication with a gaseous medium outside the unit is established by piercing the sealing means. For example a hole or holes may be drilled in the sealing means to establish such communication. In any case, the piercing operation can be performed very easily by a simple tool.

Preferably, on termination of the communication, the hole or holes pierced in the sealing means are closed by applying molten material and allowing it to solidify. This method of resealing the unit is very simple and requires for example, when using metal as the sealing material, only a soldering iron and a small amount of solder. Of course the sealing substance used in the re-sealing operation has a melting point lower than that of the lead alloy or other sealing ribbon.

In certain embodiments of the invention the pressure conditioning takes place while the panel unit is being transported by a conveyor. By proceeding in this way it is possible for double or multiple panel units to be conditioned continuously in a mass-production plant with substantial advantages in terms of saving in handling costs. The conditioning of the unit on the conveyor can be performed in a completely automatic manner.

In certain embodiments of the invention, the method according to the invention as hereinbefore defined is performed for conditioning two or more double or multiple panel units simultaneously, the units being assembled so that at least one sheet of each unit becomes flexed under the exerted sheet-flexing force. The conditioning of units can in that way proceed very rapidly.

The invention is of particular importance in the conditioning of panel units in which the panel sheets are made of glass.

The invention is of importance in the conditioning of panel units in which the sheets of glass, vitrocrystalline material or plastic are light-transmitting, i.e., transparent or translucent, and in the conditioning of other glazing units, e.g., units composed of sheets of glass which are opaque or which have been rendered opaque, as for example by an opaque coating. It is to be understood that the invention is not restricted to the conditioning of panel units which are or can be used as glazing units, but can be used in the conditioning of other panel units, e.g., units in which the interior space or spaces are filled or partly filled with solid material for thermal insulation or other purposes.

The sheets of the panel unit need not be of the same composition. For example the panel may include a glass sheet and a plastic sheet.

The invention also includes apparatus for use in conditioning internal pressure in a double or multiple panel unit having at least two spaced sheets, each composed of glass, plastic or vitrocrystalline material, and including sealing means enclosing the space or spaces between such sheets, the apparatus including means for exerting flexing force on at least one of the sheets of the unit via mechanical means in contact with a face of such sheet.

Preferably the force-exerting means includes at least one member mounted for displacement towards and away from a face of such sheet. The force-exerting means may, for example, be composed of a pair of clamping members which are displaceable in mutual alignment against the outer faces of a panel unit placed between them.

Apparatus according to the invention affords many advantages. In particular the apparatus enables panel units to be conditioned without the use of a vacuum chamber for accommodating the units during the conditioning treatment.

Preferably the force-exerting means includes at least one substantially elastically deformable member for contacting a sheet face. The provision of such a member assists in preventing damage to the contacted sheet face and in ensuring a satisfactory distribution of the flexing force.

Advantageously, the force-exerting means is coupled to a device for measuring or indicating the degree of sheet flexure caused by the exerted force. Such a device enables the conditioning treatment to be more easily controlled. By way of example, a measuring instrument may be used which is calibrated in terms of altitude so that when the degree of flexure is correct the instrument registers an altitude corresponding with the altitude of the intended place of installation of the unit.

In certain apparatus according to the invention, the force-exerting means includes at least one elastically deformable inflatable member for contacting and transmitting flexing force to a sheet. Such a member enables a very good distribution of the exerted force to be achieved. Preferably means is provided for adjusting the inflated pressure of the member.

In some embodiments of the invention the force exerting means includes at least one member for contacting and transmitting flexing force to a sheet, such member being in the form of a suction element connected to means for maintaining a reduced pressure or vacuum therein, and being displaceable for causing outward flexure of a sheet. Such an apparatus is useful for conditioning units which are intended to be used at a lower altitude than that of the place where the units are conditioned.

The invention also includes apparatus in which the force-exerting means includes a spindle with two lengths of screw-thread of respectively opposite hand which make screw engagement with components to which toggle links are connected so that portions of such links radially outwardly from, or radially inwardly toward, the axis of such spindle, depending on the direction in which it is rotated, the toggle links or a part or parts carried thereby being adapted to make contact with an adjacent sheet or sheets for transmitting flexing forces thereto. This type of mechanism permits the exertion of flexing forces which are very well controlled. A measuring instrument may be connected to the mechanism for measuring and registering the extent of curvature imparted to a sheet or sheets. The magnitude of the flexing force or forces depends on the degree of rotation of the spindle.

The components which make screw-threaded engagement with the spindle may be joined by toggle links on each side of the spindle so that flexing forces may be transmitted simultaneously to sheets disposed on opposite sides of the mechanism and belonging to different panel units.

The toggle links may carry a pressure member or members for exerting pressure on a sheet or sheets, or such toggle links may carry one or more suction elements enabling a sheet or sheets to be given an outwardly convex curvature so that the interior volume of the or each unit is enlarged.

If the mechanism is double-acting in the sense that it includes opposed pressure or suction members the mechanism can of course be used not only for simultaneously exerting flexing forces on sheets belonging to two glazing units but also for exerting a flexing force on one sheet. In the latter case the mechanism can be operated, for example, while disposed between the sheet which is to be flexed and a fixed support, e.g., a wall.

The invention also includes double or multiple glazing units with at least one internal space the pressure in which has been conditioned by a method according to the invention as hereinbefore defined.

DESCRIPTION OF THE PREFERRED EMBODIMENTS

As a rule, multiple glazing units are treated according to the invention while in a vertical position to avoid disturbing effects due to the weight of the sheets of the units. However, it is possible to treat the units in the horizontal position, in which case the weight of the sheets contributes to their flexing, which can be an advantage.

The drawings are not to scale and, in particular, the degree of flexure is considerably exaggerated.

Figures 1, 2, 3:
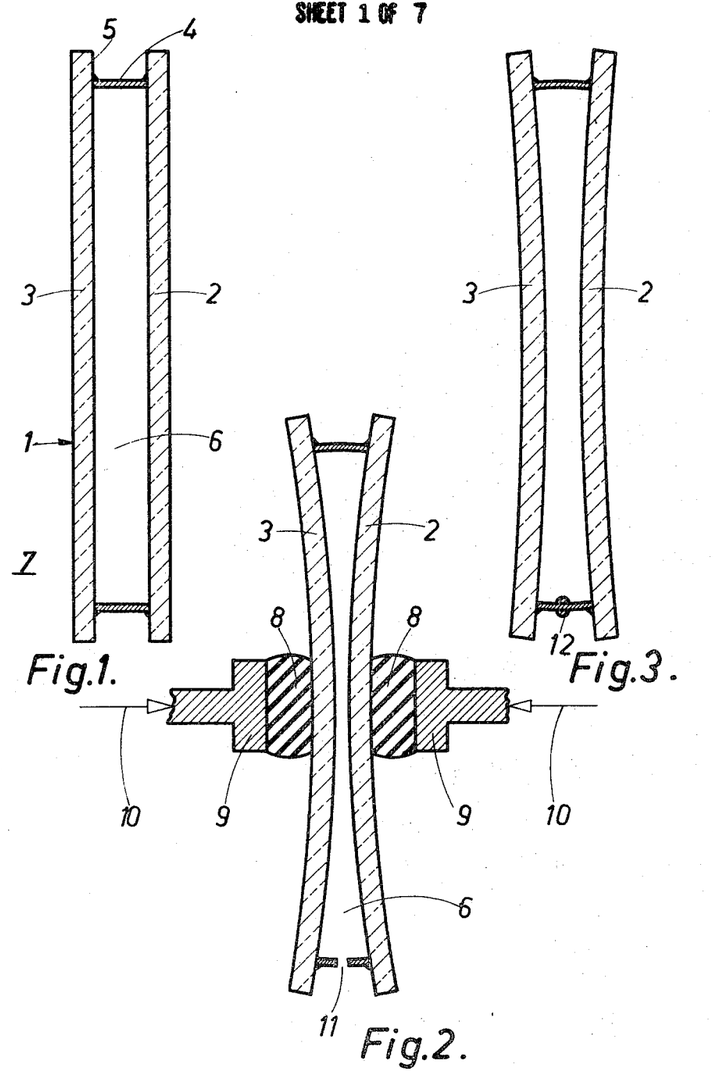
FIG. 1 is a cross-sectional view of a double glazing unit having a metallic ribbon welded to metallized margins of the two sheets.
FIG. 2 is a cross-sectional view illustrating one method according to the invention of conditioning the pressure in the space inside the glazing shown in FIG. 1.
FIG. 3 is a cross-sectional view illustrating the glazing after conditioning by the method shown in FIG. 2.

FIG. 1 shows, in section, a double glazing unit 1 having two sheets 2 and 3 of glass of conventional composition connected along their margins by a lead alloy ribbon 4 which is welded or soldered to metallized margins 5 of the glass sheets and which seals the interior space 6 between the sheets. The metal coatings on the sheet margins are not shown in the drawings.

The glazing unit 1 is hermetically sealed and the interior space 6 contains dry air at a pressure substantially equal to the pressure in the environment 7.

Turning to FIG. 2, to condition the pressure in the space 6 with a view to the eventual installation of the unit 1 at a higher altitude, rubber pads 8 carried by metal clamping members 9 are applied substantially to the centers of the two sheets of glass. Equal and opposite forces 10 are applied by means (not shown) to the clamping members 9, thus flexing the sheets 2 and 3 and reducing the volume of the interior space 6.

A hole is drilled in the metal ribbon sealing member 4 shortly after the forces 10 have come into operation. Consequently dry air is expelled from the interior space 6 into the surrounding environment.

Entry of air from the environment into the space 6 is prevented by a covering of molten weld or solder metal (not shown) in FIG. 2) over the hole 11. The weld metal is kept in the molten state to allow bubbles of dry air to escape through the weld metal. As soon as the pressure in space 6 is equal to the pressure in the environment, escape of air from the interior of the unit ceases. The weld metal is then allowed to solidify, thus hermetically sealing the unit.

The forces 10 are then relaxed and the metal members 9 bearing the rubber pads 8 are withdrawn. The double glazing unit then has the form shown in FIG. 3.

From FIG. 3, in which the welding metal 12 is shown closing the hole 11, it can be seen that the two sheets 2 and 3 are less curved than they are in FIG. 2. This is due to partial elastic recovery of the sheets 2 and 3 upon the relaxation of the pressure exerted via the members 9.

The pressure in the sealed and conditioned unit is calculated so that the sheets of the double glazing unit will become substantially flat as illustrated in FIG. 1 when the unit is installed at the intended higher altitude.

Figures 4, 5:
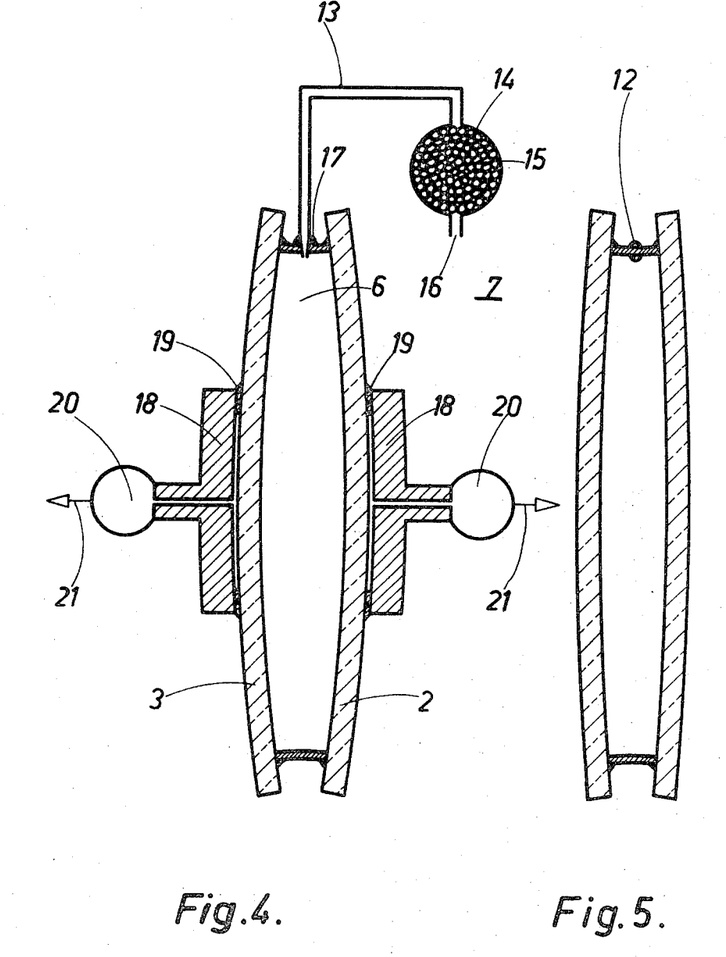
FIGS. 4 and 5 are cross-sectional views respectively showing a modified conditioning method according to the invention and the resulting glazing.

FIGS. 4 and 5 illustrate a conditioning method for conditioning a glazing unit which is to be installed at a lower altitude or at a place where the environmental pressure is higher than that at the place where the unit is constructed.

The glazing unit shown in FIGS. 4 and 5 is a double glazing unit similar to that illustrated in FIG. 1. The metal ribbon enclosing the interior space 6 is pierced by a heated hollow needle connected to a tube 13 extending to a container 14 containing a dehydrating substance 15 and communicating with the environment 7 via orifice 16.

A small amount of metal solder 17 is applied to the joint between the ribbon and the hollow needle to prevent any non-dehydrated air from passing from the environment 7 into the interior of the glazing unit.

Suction elements 18 having rubber sealing pads 19 are applied against the central portions of the sheets 2 and 3. Each of the suction elements is connected to a container 20 in which a vacuum or partial vacuum is created. Forces are exerted on the suction elements in the directions indicated by arrows 21, by a mechanism which is not shown, so as to flex the sheets 2 and 3 outwardly as shown in FIG. 4, thereby enlarging the interior space 6. During this operation, non-dehydrated gas passes from the environment 7 into container 14, is dehydrated by the dehydrating substance 15, and passes into the interior of the glazing unit.

When the pressure in the space 6 equals the environmental pressure, the hollow needle connected to the tube 13 is heated and then withdrawn. The metal solder 17 is thereby caused automatically to close the hole in the ribbon which was occupied by the needle and to form a bead 12 as shown in FIG. 5.

The vacuum in the container 20 is then broken and the suction elements 18 are then withdrawn from the sheets 2 and 3. The conditioned double glazing unit then assumes the shape shown in FIG. 5, thus causing the pressure in the space 6 to be higher than that of the environment.

When the conditioned double glazing unit is installed at the intended altitude or in another environment at the intended pressure, the sheets 2 and 3 become substantially flat, and at that time the pressure in space 6 will be about equal to that of such environment.

The methods so far described and illustrated are very suitable for small-scale serial production.

Large-scale conditioning is preferably performed by a method according to the invention in which a plurality of glazing units are simultaneously conditioned by one apparatus. Examples of such a method are illustrated in FIGS. 6 to 9.

Figure 6:
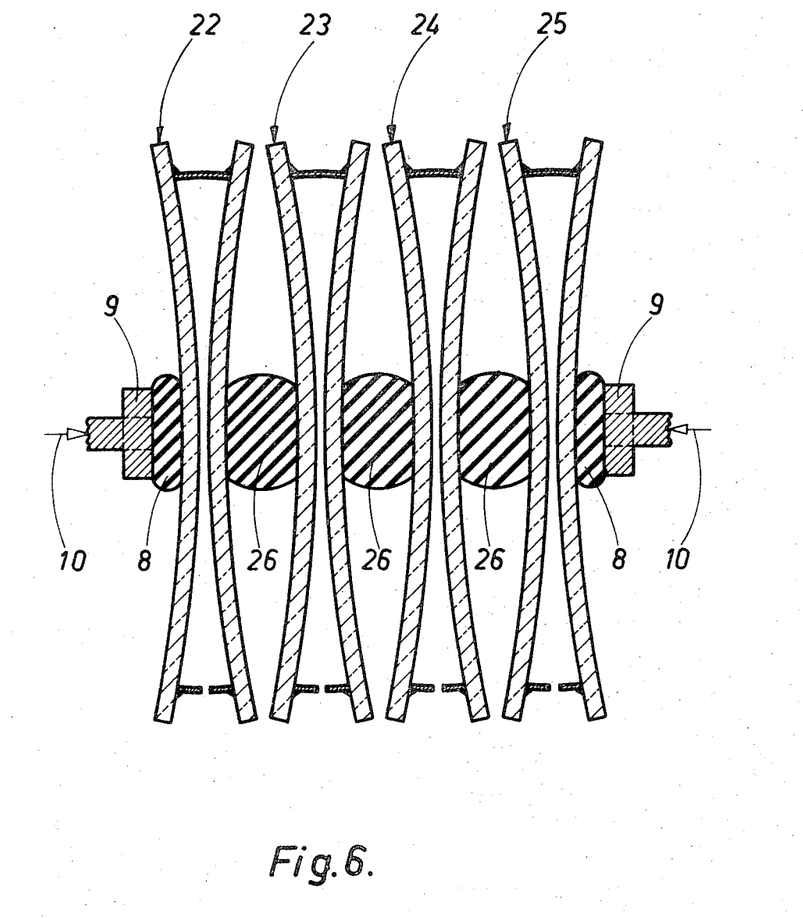
FIG. 6 is a cross-sectional view showing a method of conditioning a plurality of units.
Figure 7:
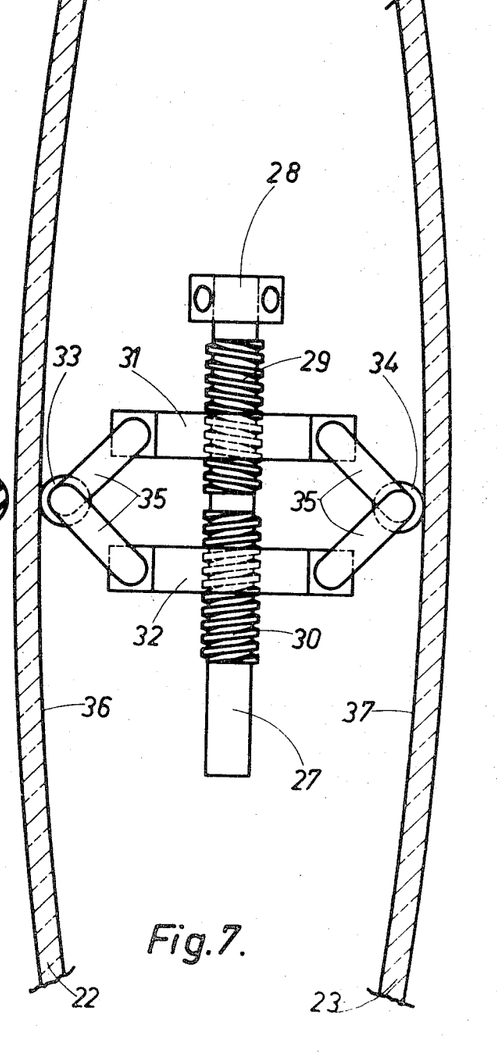
FIG. 7 is a cross-sectional detail view of part of another conditioning unit in accordance with the invention.

FIGS. 6 and 7 illustrate the conditioning of double glazing units for installation at a higher altitude.

FIG. 6 shows four double glazing units 22, 23, 24 and 25 disposed in parallel between two clamping members 9 fitted with rubber pads 8. Rubber pads 26 are disposed between the glazing units. The clamping forces exerted in the directions indicated by the arrow 10 cause flexure of the sheets of all of the units in the required manner.

The conditioning method is the same as that described with reference to FIG. 2 except for the fact that four units are conditioned together. Of course, the method can be applied for simultaneously conditioning a larger number of double glazing units.

Screw devices like that shown in FIG. 7 can be used instead of the rubber pads 26. The screw devices shown in FIG. 7 include a spindle 27 retained at the end shown in FIG. 7 by a bearing 28. Two screw-threads 29 and 30 of trapezoidal cross-section and of respectively opposite hand are machined on the spindle 27. Cross-pieces 31 and 32 make threaded engagement with the screw-threads 29 and 30, repsectively. Two small hard plastic wheels 33 and 34 are rotatably mounted on toggle links 35 so that when the spindle 27 is turned the movement of the cross-pieces 31 and 32 towards or away from each other, depending on the direction of rotation of the spindle, causes the wheels 33 and 34 to move outwardly from or inwardly towards the spindle. In the illustrated situation, the wheels 33 and 34 have been moved outwardly to press against the outer surfaces 36 and 37 of two sheets belonging to two adjacent glazing units.

The degree of flexure of the sheets 36 and 37 can be readily measured as a function of the rotational position of the spindle 27.

When using screw devices as illustrated in FIG. 7 the series of glazing units to be conditioned can be located between fixed abutments instead of movable clamping members such as the members 9 of FIG. 6.

Figure 8:
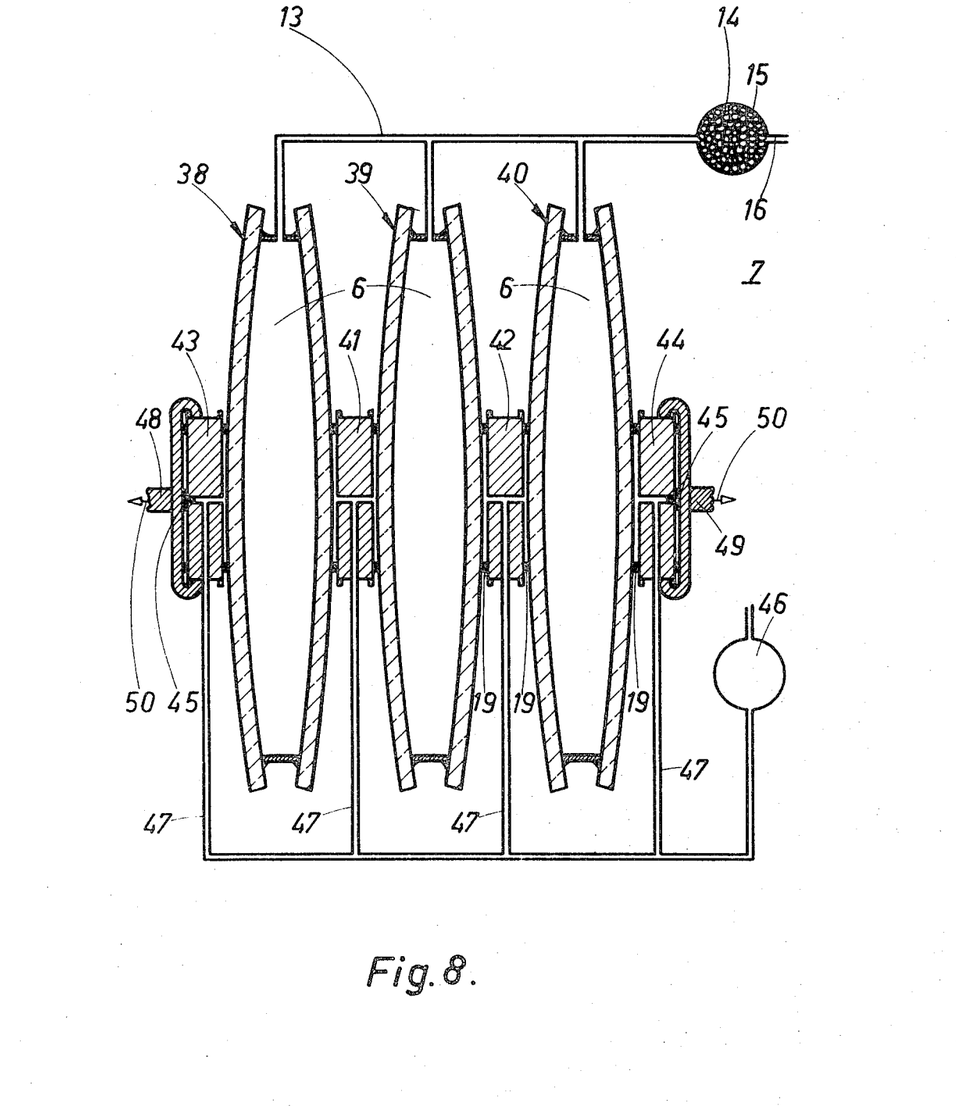
FIGS. 8 and 9 are cross-sectional views illustrating further arrangements for conditioning a plurality of units.

FIG. 8 shows the simultaneous treatment of three double glazing units which are subsequently to be installed at a place where the environmental pressure is higher. Although the conditioning apparatus used is more complicated than that illustrated in FIG. 4, it operates on the same principle as that more simple apparatus.

As shown in FIG. 8, three double glazing units 38, 39 and 40 of identical dimensions are treated in parallel. The spaces 6 inside the glazing units communicate with the environment 7 via a tube 13 connected to a container 14 containing a dehydrating substance 15 and having an outlet aperture 16.

Double-acting suction elements 41 and 42 are disposed respectively between the glazing units 38 and 39 and between the glazing units 39 and 40. Further suction elements 43 and 44 are placed against the outer surfaces of the glazing units 38 and 40, respectively. These suction elements 43 and 44 are identical with the double-acting suction elements 41 and 42 but the air inlet passage on one side of each of the suction elements 43 and 44 is closed by a plug 45. The suction elements 41, 42, 43 and 44 all communicate via conduits 47 with a container 46 in which a vacuum is established.

Grippers 48 and 49 are applied to the suction elements 43 and 44 and are pulled in respectively opposite directions, as indicated by the arrows 50, so that the sheets of each glazing unit are outwardly flexed, thereby increasing the volume of the space within each unit and causing gas from the environment 7 to be drawn into the units via the mass of dehydrating substance 15.

When the pressure in the spaces 6 is identical with that in the environment 7, the orifices formed in the metal ribbons of the glazing units are sealed off. This sealing may be achieved for example by a method as described with reference to FIGS. 4 and 5.

Clearly, the number of double glazing units which can be conditioned by the method illustrated in FIG. 8 is not limited to three, since the plugs 45 can be removed from the suction elements 43 and 44 and any further number of double glazing units and double-acting suction elements can be added.

Figure 9:
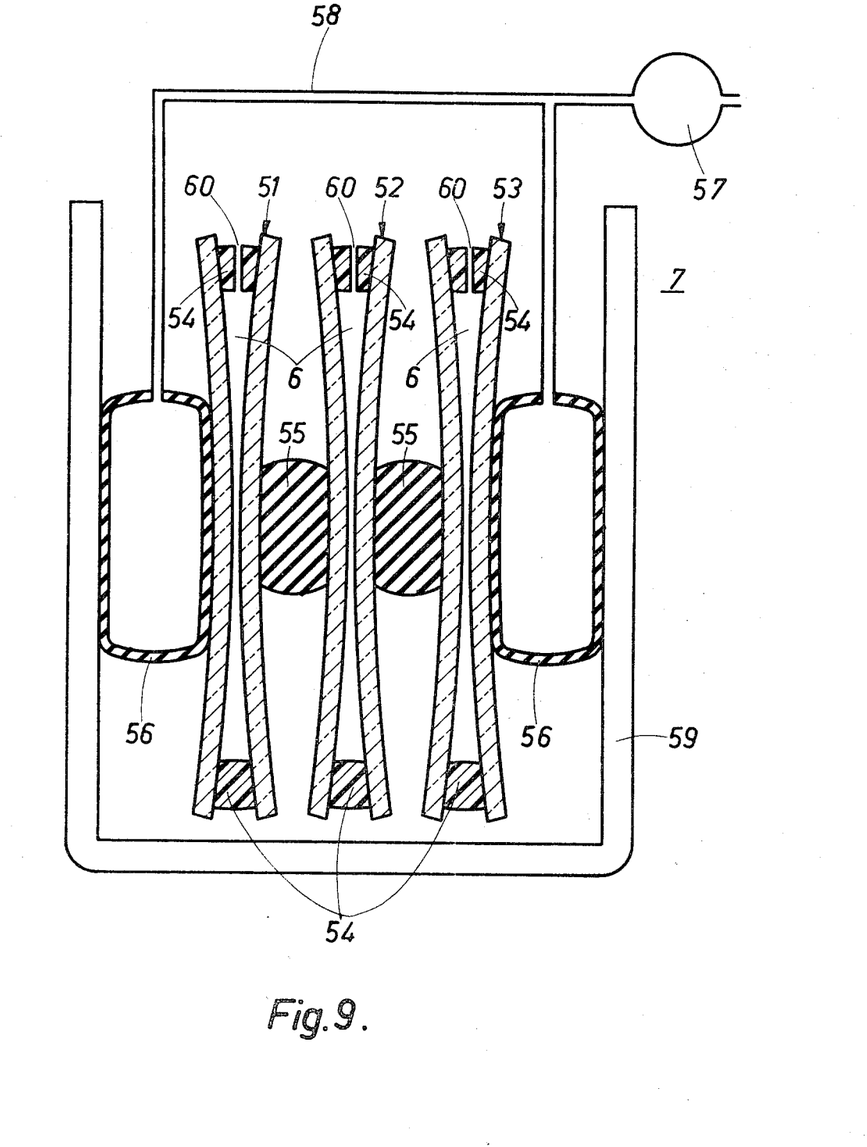

FIG. 9 shows a method of conditioning the pressure in the spaces 6 inside three double glazing units 51, 52 and 53, each made up of two sheets of glass cemented at their margins to intervening rubber strips 54.

The three double glazing units are disposed substantially in parallel. Rubber pads 55 are disposed between the units 51 and 52 and between the units 52 and 53, respectively. Rubber air cushions 56, which are connected via a connecting tube 58 to a container 57 containing gas under a controllable pressure, are placed against the outer surfaces of glazing units 51 and 53. A U-shaped support 59 embraces the assembly of glazing units, rubber pads and air cushions.

The rubber strips 54 enclosing the spaces between the sheets of the respective glazing units are pierced to form passages 60 placing the interiors of the units in communication with the environment 7. Air is then forced into the air cushions 56, so as to cause the sheets of the units to become flexed as shown in FIG. 9. The air pressure in the reservoir 57 is read off on a sensitive manometer directly calibrated in meters, corresponding to the altitude of the place where the double glazing units are subsequently to be installed. The calibration is related to a predetermined number of double glazing units of predetermined specifications.

When the volumes of the interior spaces of the glazing units have been reduced to a predetermined value, the passages 60 are sealed off by introducing a rapidly drying glue therein. The pressure in the air cushions 56 is then relieved. The glazing units are then ready to be delivered to the customer. The number of double glazing units which can be simultaneously treated as shown in FIG. 9 is of course not limited to three.

Figure 10:
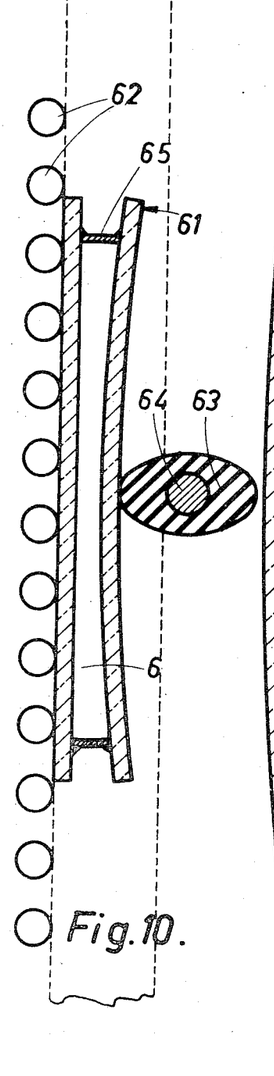
FIG. 10 is a cross-sectional plan view illustrating a method of conditioning units on a conveyor.

FIG. 10 shows a method of conditioning the pressure in the interior space 6 of a double glazing unit 61 while the unit is supported edgewise on a horizontal belt conveyor, shown in broken lines, the unit being supported on one side, in a substantially vertical position, by a series of vertically extending conveying rollers 62. By supporting the unit substantially vertically, the exposed sheet is prevented from flexing under its own weight. The flexing force is in this case exerted by a hard rubber cam 63 of elliptical profile, mounted on a rotary steel spindle 64. The rotation of the cam 63 is synchronized with the movement of the double glazing unit on the conveyor.

When the unit reaches the illustrated position, the conveyor is temporarily stopped and the ribbon 65 is pierced with a heated hollow needle which is similar to that shown in FIG. 4 and which places the interior of the unit in communication with the ambient air so that gas escapes from the interior of the unit to render the internal pressure equal to atmospheric pressure. The needle is then withdrawn while in heated condition so that the hole in the ribbon becomes automatically sealed. The conveyor is then restarted to move the unit away from the conditioning station.

Methods of predetermining the degree of sheet flexure necessary to ensure that the sheets of the unit, when it is installed under the intended environmental pressure, will be substantially flat, will be readily apparent to competent workers in this field.

By way of example, a total curvature corresponding with a 4.4 mm aggregate displacement of the sheet centers must be given to the two sheets of a double glazing unit measuring 1 m × 1.5 m and having an inter-sheet spacing of 12 mm if the unit is intended for installation at an altitude of 1,200 m and conditioned at sea level. The thickness at the center of the glazing unit must therefore be reduced by 4.4 mm while its interior communicates with the environment. The communication between the inside space and the environment is then interrupted, whereafter the flexing force is relaxed. The sheets of the double glazing unit are then slightly curved toward one another. The curvature depends on the thickness of the sheets of glass or other material used and will become zero when the unit is installed at the intended altitude of 1,200 m.

The total curvature (expressed as aggregate displacement as above referred to) is 3.2 mm for a glazing 0.9 m × 0.8 m having an inter-sheet space of 9 mm intended to be installed at an altitude of 1,200 m.

There are various other methods which can be employed, within the scope of the invention.

According to one particularly simple method, a double glazing unit is placed horizontally on a chock disposed at the center of the bottom sheet. The two sheets become flexed in the required direction under the action of their own weights, the flexure of the bottom sheet being made possible by the presence of the chock. The degree of flexure reduces the volume of the space inside the unit to an extent which makes the unit suitable for installation at an altitude which can be readily calculated.

This latter method of conditioning is particularly simple to perform, since it merely requires the use of chocks of predetermined thicknesses, each thickness corresponding to a particular installation altitude for given sizes and flexibilities of sheets. The method is very suitable for conditioning on a small scale, inter alia for conditioning a small number of multiple glazing units of different sizes to be installed at the same altitude. The method is primarily applicable in the conditioning of relatively large multiple glazing units. When conditioning small multiple glazing units, a number of other glazing units can be superimposed on the unit being conditioned, in order to exert the required pressure against the chock.

In another conditioning method according to the invention, the required flexing forces are exerted on the lower sheet of a multiple glazing unit during transportation by a conveyor. Conditioning can be performed continuously by such a method. The flexure of the lower sheet can be brought about, for instance, by a roller of the conveyor, the roller projecting above the plane of conveyance to an extent determined by calculation using a computer programmed with relevant data, including the sizes of the multiple glazing units and the intended installation altitude.

The methods according to the invention so far specifically described are intended for conditioning units which are initially filled with dehydrated gas. When the conditioning units contain non-dehydrated gas, it is a simple matter to arrange for the evacuation of this gas and its dehydration or replacement by dehydrated gas. For example, the interior of the unit can be swept with dehydrated gas via openings created for that purpose or both for that purpose and for the purpose of conditioning the internal pressure as hereinbefore described.

In a particular embodiment of the invention, at least one sheet of the unit is held elastically flexed while the interior of the unit is swept with a hot dry gas, whereafter the unit is hermetically sealed before the gas introduced into it has cooled. In this case the change in the interior volume of the unit caused by the sheet flexure and the temperature and pressure of the gas introduced into the unit are factors which determine the environmental pressure conditions under which the sheets of the unit will revert to a flat condition.

In a further conditioning method according to the invention, the gaseous medium with which the interior of the unit is in communication prior to being sealed and while at least one of the sheets of the unit is held elastically flexed, is at a pressure different from the prevailing atmospheric pressure. The step of providing a supply of medium under other than the prevailing atmospheric pressure is justified in special cases, e.g., for conditioning multiple glazing units composed of sheets which could not withstand being elastically flexed to the extent which would be necessary to achieve the required internal pressure if the filling medium were under a pressure corresponding with the prevailing atmospheric pressure.

As an alternative to placing the interior of the glazing unit in communication with a medium at a pressure different from the prevailing atmospheric pressure, the unit interior may be placed in communication with a medium which is at such atmospheric pressure but at a temperature different from the prevailing atmospheric temperature. For example a heated gaseous medium can be introduced into the unit while flexing forces are exerted on at least one sheet of the unit.

Of course the medium with which the interior of the unit is placed in communication during the conditioning treatment can be a medium both the pressure and the temperature of which differ from the prevailing ambient pressure and temperature, if that should in any particular case be required.

The illustrated embodiments relate to the conditioning of double glazing units, but the invention is not limited thereto; the invention can be applied for conditioning multiple glazing units having three or more spaced sheets.

Triple glazing units can be treated in the same way as double glazing units, but if the outer sheets are of different specifications, e.g., of different thicknesses, it may be necessary to condition the pressures in the two interior spaces so that these pressures are different from one another.

There are a number of ways of proceeding in the case of quadruple glazing units. For instance, the manufacture of a quadruple glazing unit can be interrupted when only three of the four sheets have been assembled and the two internal spaces thus formed can be conditioned before the unit is completed by the addition of the fourth sheet. All that then remains to be done is to condition the pressure in the internal space enclosed by this fourth sheet.

A completed quadruple glazing can be conditioned by flushing the middle internal space with hot or cold dry air so as to dehydrate such space and sealing such space before the air therein has reached the prevailing ambient temperature, and then conditioning the two outer spaces by a method according to the invention.

In another method of conditioning a quadruple glazing, a considerable force is exerted on the outer sheets while only the central interior space is in communication with the environment so that the two inner sheets are elastically flexed. After sealing the central space the flexing force exerted on the outer sheets is reduced and the two outer internal spaces are placed in communication with the environment and re-sealed before the outer sheets are relieved, or before they are completely relieved, of flexing forces.

As when conditioning a triple or double glazing unit, a number of different factors, such as the flexing force magnitude and the pressure and/or temperature differential, may have to be controlled in concert when conditioning a quadruple glazing unit. For instance, a quadruple glazing unit can be conditioned by exerting flexing forces on the outer sheets of the unit while the central space is in communication with a medium outside the unit and while the two outer internal spaces are also in communication with a medium at a different pressure in order that the forces can be more effective in changing the volume of the central space. After hermetically sealing the central space the pressure in the two outer spaces can be conditioned to the requisite pressure by appropriate control of the flexing forces followed by hermetic sealing of such outer spaces.

Multiple glazing units having more than four sheets can be treated in a manner similar to that for quadruple glazing units. It is usually preferable to condition first the inner spaces and then the outer spaces when treating units comprising more than four sheets.

The illustrated glazing units are composed of sheets of glass. At least one of the glass sheets can be replaced by a plastic sheet, e.g., a sheet of transparent plastic, or by a sheet of vitrocrystalline material. In one particular embodiment, a double glazing unit of the form illustrated in FIG. 2, but in which the sheet 2 was made of glass and the sheet 3 of a vitrocrystalline material of conventional composition, was conditioned in accordance with the invention.

In another embodiment, the method according to the invention was performed for conditioning the internal space in a double panel unit of the general form of the unit shown in FIGS. 1 and 2 but composed of two opaque sheets of coated glass and a layer of heat insulating material located in the space between such sheets.

In the illustrated embodiments, the sealing means enclosing the space between the sheets of the or each glazing unit is in the form of a lead alloy ribbon welded to metallized margins of the sheets, or in the form of a rubber strip glued to the margins of the sheets. Other kinds of sealing means can be used, for instance: a plurality of strips, one strip being disposed along each margin of the unit; a frame holding the peripheries of the sheets and shaped to provide a spacing portion or portions intruding between the sheets; or any sectional members (which may if required hold a quantity of dehydrating material) made of plastic, wood, glass or any other synthetic or natural material and secured in position either permanently or so that the unit can be disassembled.

Thus, the invention can be applied for conditioning allglass glazing units provided that an aperture is present (as is usually the case) or can be formed to permit gas to be introduced into or evacuated from the unit.

Figures 11, 12:
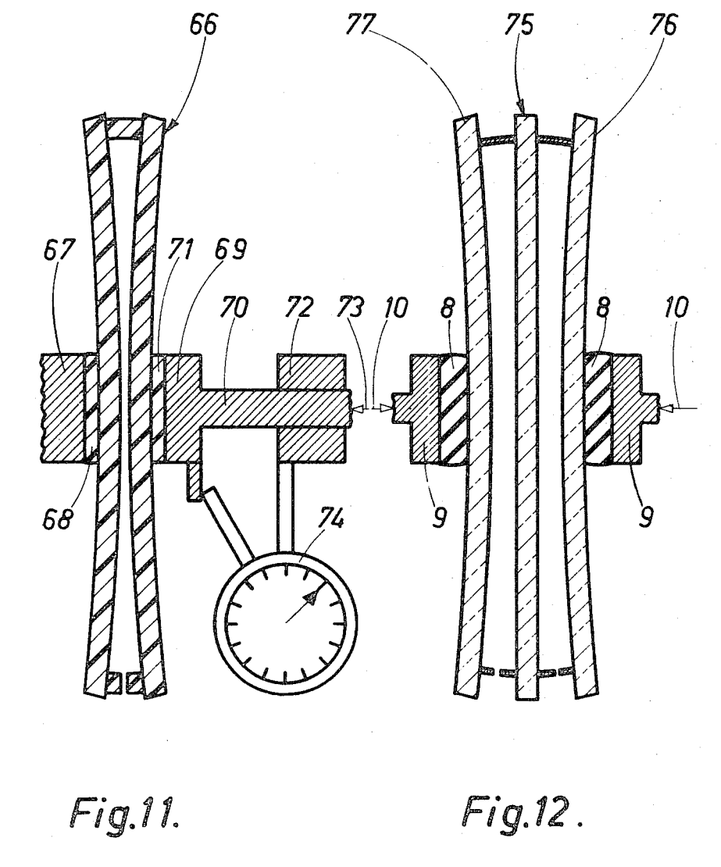
FIG. 11 is a cross-sectional view illustrating a method of conditioning a double-glazing unit, using a curvature measuring device.
FIG. 12 is a cross-sectional view illustrating a method of conditioning a triple glazing.

Certain special examples are illustrated in FIGS. 11 and 12. FIG. 11 illustrates in section a method of conditioning a double glazing unit made of sheets of transparent plastic, e.g., acrylic plastic. The double glazing unit 66 is placed between a fixed abutment 67 covered with a thin layer 68 of protective plastic, and a movable clamping member 69 mounted on a rod 70. The member 69 is also covered with a thin layer 71 of protective plastic. The rod 70 slides in a fixed guide 72.

A force is exerted on the rod 70 in the direction indicated by arrow 73 to reduce the volume of the space inside the unit 66. A measuring instrument 74 directly indicates the degree of curvature imparted to the sheets. In another embodiment, a double glazing unit composed of two sheets both of which were of vitrocrystalline material of a conventional composition was conditioned by the method illustrated in FIG. 11.

FIG. 12 shows a triple glazing unit 75 during conditioning. The conditioning is achieved by apparatus similar to that shown in FIG. 2 and the illustrated parts of this apparatus are denoted by the same reference numerals as in FIG. 2.

It will be understood that the above description of the present invention is susceptible to various modifications, changes and adaptations, and the same are intended to be comprehended within the meaning and range of equivalents of the appended claims.

We claim:

1. A method of conditioning the internal pressure in a multiple panel unit composed of at least two spaced sheets, each composed of glass, plastic or vitrocrystalline material, and sealing means which includes at least one spacer connected to margins of the sheets for enclosing the interior space between each adjacent pair of sheets, comprising temporarily exerting a flexing force on at least one of the sheets via mechanical means in contact with a face of such sheet constituting an external face of the unit, the force being directed toward the interior of the unit so as to reduce the volume of at least one interior space and, during the period of time for which such sheet is held elastically flexed, placing the at least one interior space in communication with a gaseous medium which is outside the unit under pressure and temperature conditions such that gaseous medium flows from the space to the region outside the unit to bring the pressure in the space to a required lower value, such communication being established at least during said step of exerting a flexing force, and terminating such communication before removing such force.

2. A method as defined in claim 1 wherein said step of exerting is carried out by simultaneously subjecting the external sheet faces of the unit to equal and oppositely directed forces.

3. A method as defined in claim 1 wherein the gaseous medium outside the unit is the gaseous environment surrounding the unit.

4. A method as defined in claim 1 wherein the spacer comprises at least one metal ribbon welded or soldered to metallized margins of the sheets.

5. A method as defined in claim 1 wherein the communication with a gaseous medium outside the unit is established by piercing the sealing means.

6. A method as defined in claim 5 wherein said step of terminating is carried out by closing the hole or holes pierced in the sealing means by applying molten material and allowing it to solidify.

7. A method as defined in claim 1 wherein said steps are carried out while the unit is being transported by a conveyor.

8. A method as defined in claim 1 for conditioning a plurality of such panel units simultaneously, comprising the step of assembling the units so that at least one sheet of each unit becomes flexed by the sheet-flexing force.

9. A method as defined in claim 1 wherein the panel unit is light-transmitting.

10. A method as defined in claim 1 wherein the unit is a glazing unit.

11. Apparatus for use in conditioning the internal pressure in a multiple panel unit composed of at least two spaced sheets, each composed of glass, plastic or vitrocrystalline material, and sealing means enclosing the space between each adjacent pair of sheets, said apparatus comprising means for exerting a flexing force on at least one of the sheets of the unit and composed of a spindle with screw-threads of respectively opposite hand, a pair of movable means threadedly engaged with said threads, toggle links connected to said movable means so that when said spindle is rotated portions of said links move radially with respect to the axis of said spindle in a direction which depends on the direction in which said spindle is rotated, and means mounted at the pivot points of said toggle links midway between said movable means and arranged to make contact with such sheet for transmitting flexing forces thereto.

* * * * *

UNITED STATES PATENT OFFICE
CERTIFICATE OF CORRECTION

Patent No. 3,842,567　　　　　　　Dated October 22nd, 1974

Inventor(s) Jacob Zwart et al

It is certified that error appears in the above-identified patent and that said Letters Patent are hereby corrected as shown below:

In the heading of the patent, under [75] Inventors:, change "Guens" to --Geuens--.

Column 6, line 47, after "links" insert --move--.

Signed and sealed this 14th day of January 1975.

(SEAL)
Attest:

McCOY M. GIBSON JR.　　　　　　C. MARSHALL DANN
Attesting Officer　　　　　　　　Commissioner of Patents